United States Patent [19]

Dugge

[11] Patent Number: 4,768,684
[45] Date of Patent: Sep. 6, 1988

[54] GASKET FOR HOPPER OUTLET

[75] Inventor: Richard H. Dugge, St. Louis, Mo.

[73] Assignee: ACF Industries, Incorporated, Earth City, Mo.

[21] Appl. No.: 18,803

[22] Filed: Feb. 24, 1987

Related U.S. Application Data

[63] Continuation of Ser. No. 793,753, Nov. 1, 1985, abandoned.

[51] Int. Cl.[4] .......................... B65D 53/00; B67D 5/06
[52] U.S. Cl. ..................................... 222/542; 406/145; 285/368; 285/910; 277/180
[58] Field of Search ................. 222/542, 195; 406/145; 105/285; 285/349, 368, 379, 910; 277/207 R, 180

[56] References Cited

U.S. PATENT DOCUMENTS

| 830,392 | 9/1906 | Wiedeman | 285/910 X |
| 1,045,389 | 11/1912 | Gillmor et al. | 285/268 X |
| 1,245,002 | 10/1917 | Mastin et al. | 277/207 A |
| 2,146,218 | 2/1939 | Fimmich et al. | 285/368 X |
| 2,513,178 | 6/1950 | Jackson | 285/910 X |
| 3,033,582 | 5/1962 | Creavy | 285/910 X |
| 3,158,380 | 11/1964 | Carrell et al. | 277/180 X |
| 3,215,473 | 11/1965 | Kemp et al. | 406/145 X |
| 3,840,155 | 10/1974 | Frye et al. | 222/195 |
| 4,428,603 | 1/1984 | Davlin | 285/368 |

FOREIGN PATENT DOCUMENTS 460821 12/1913 France .................. 285/368

Primary Examiner—Charles A. Marmor
Attorney, Agent, or Firm—Polster, Polster and Lucchesi

[57] ABSTRACT

A gasket for a hopper outlet is disclosed, particularly for use with an unloading outlet for a railway hopper car. The car has hopper walls which slope inwardly and downwardly, and a hopper frame is carried by the lower portions of the hopper walls. The outlet has an outlet frame which mates with and is secured to the hopper frame, with a seal between the hopper frame and the outlet frame for effectively sealing the outlet frame to the hopper frame, and for effectively preventing entrappment of powdered or particulate lading at the interface of the hopper frame and the outlet frame. In one embodiment, such a seal may be retrofitted to existing outlets.

2 Claims, 1 Drawing Sheet

U.S. Patent    Sep. 6, 1988    4,768,684
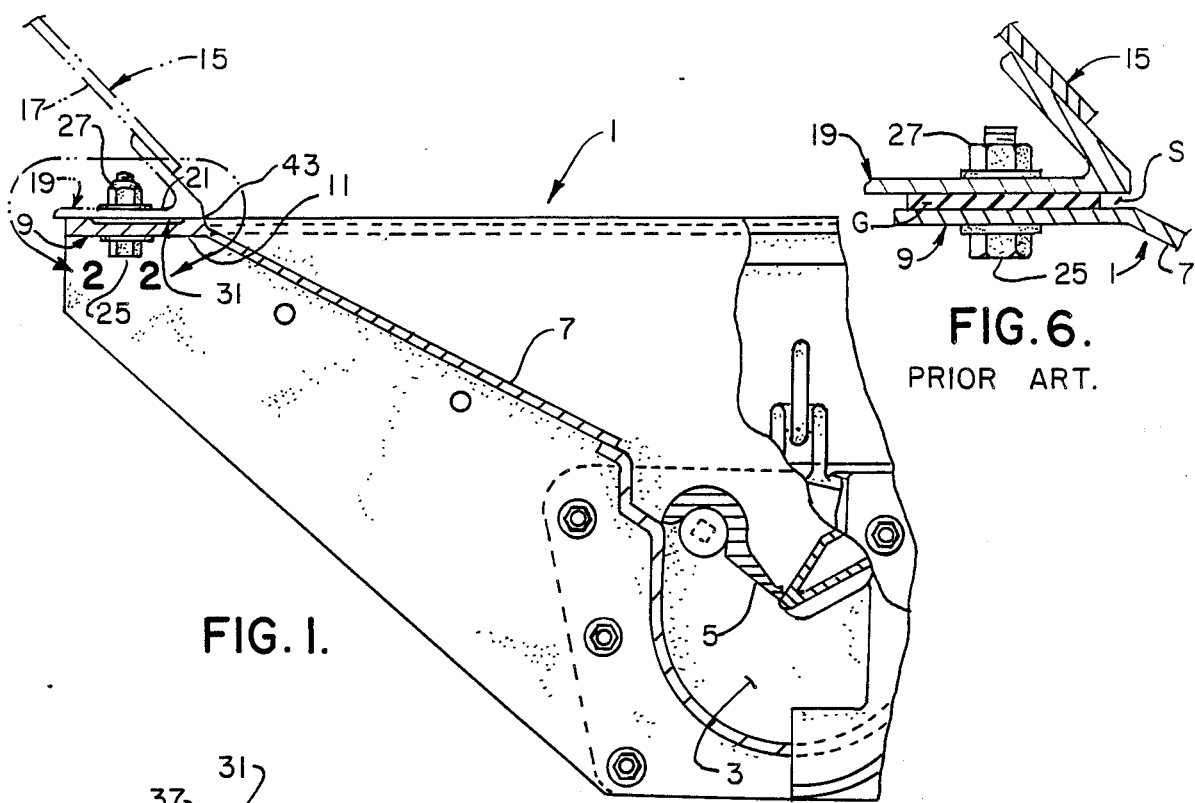
FIG. 1.
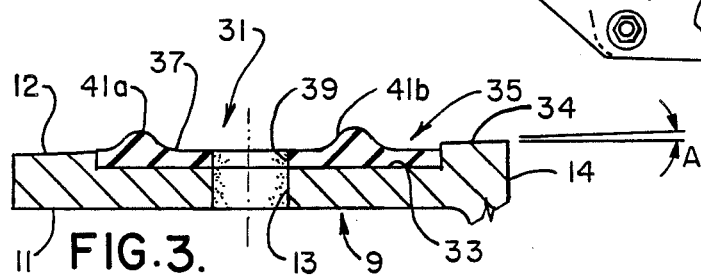
FIG. 3.
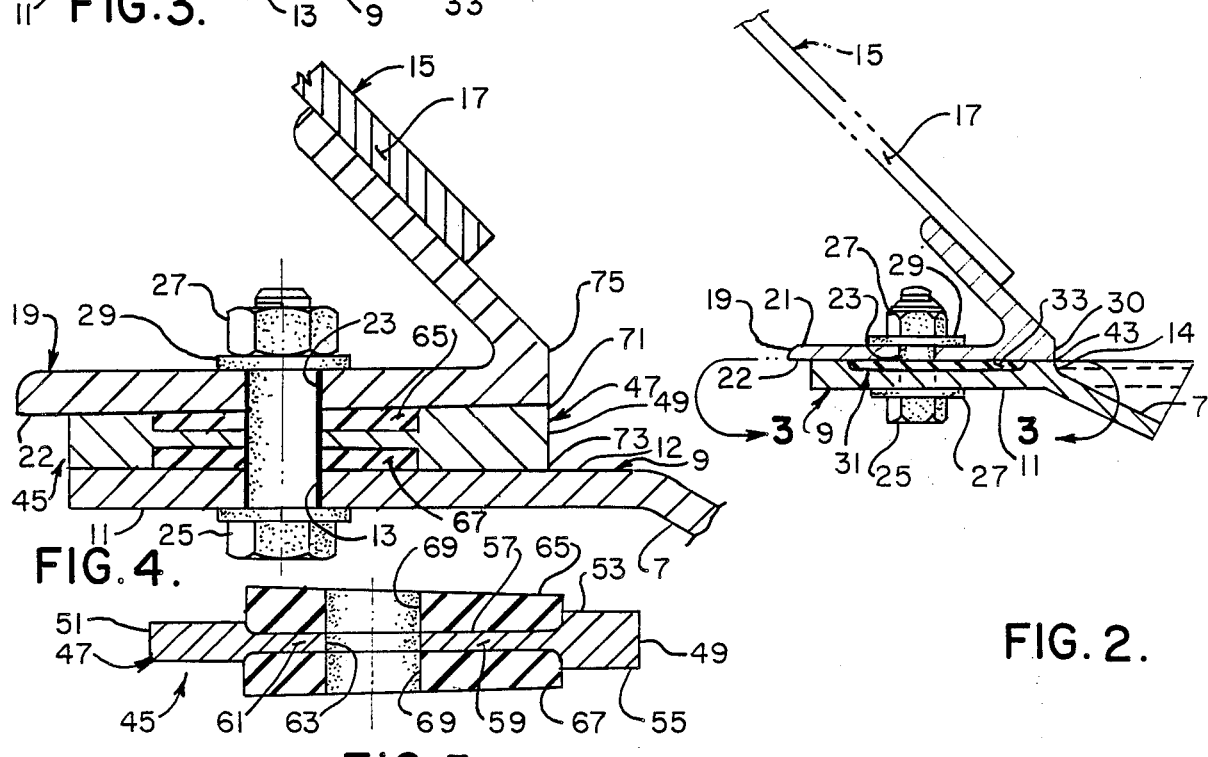
FIG. 6. PRIOR ART.
FIG. 2.
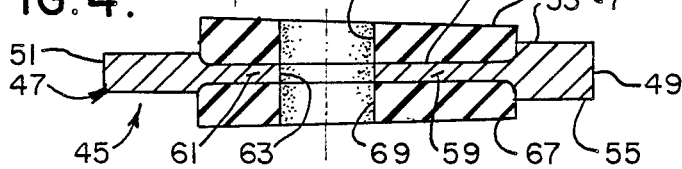
FIG. 4.
FIG. 5.

GASKET FOR HOPPER OUTLET

This is a continuation application of copending application Ser. No. 793,753, now abandoned filed on Nov. 1, 1985.

BACKGROUND OF THE INVENTION

This invention relates to a gasket for a hopper outlet, and more particularly to a gasket for use with a pneumatic outlet, as utilized on a covered hopper railway car for unloading a particulate, granular, or powdered lading.

Covered hopper railway cars are utilized to transport a wide variety of bulk particulate or powdered ladings, such as plastic pellets, cement, flour, and the like. As shown in the co-assigned U.S. Pat. Nos. 3,659,752, 3,701,460, 3,715,053, 3,778,114, and 4,114,785, such covered hopper railway cars are often provided with downwardly and inwardly sloping side walls which funnelled lading into an outlet attached to the bottom end of the hoppers of the covered hopper car. Such outlets are oftentimes pneumatic unloading outlets so constructed that air can be forceably drawn through the outlet in such manner as to entrain the particulate or powdered lading into the air moving through the outlet such that the entrained lading can be pneumatically conveyed from the hopper car.

As can be seen by referring to the above-noted prior art patents, the outlet is conventionally a trough-like weldment, having end walls and side walls sloping inwardly and downwardly toward a conduit through which air is drawn, and in which the lading is entrained in the moving air stream. An outlet frame is provided at the upper portion of the outlet side and end walls, with the outlet frame being generally rectangular. A similar downwardly facing hopper frame is secured to the lower reaches of the inwardly and downwardly extending hopper side and end walls. Typically, the outlet frame is bolted to the hopper frame, with a compressible (i.e., elastomeric) gasket interposed therebetween so as to provide a seal between the hopper and the outlet. This construction is illustrated in FIG. 6 (labelled prior art) of the instant drawings. As can be seen in FIG. 6, there was oftentimes a gap or void of at least the thickness of the gasket between the hopper frame and the outlet frame. This gap or void oftentimes entrapped small quantities of the particulate or powdered lading.

It will be appreciated that it is necessary to thoroughly clean the inside of a covered hopper railway car before a lading can be onloaded so as to ensure that the new lading is not contaminated by any residue of past ladings or the like. This cleaning process may be done by a workman who enters the car and scrubs the inside of the car, utilizing air or water pressure. However, it has been found that even small quantities of certain ladings can contaminate a new lading, and it is difficult to remove all residual lading, even with thorough cleaning.

For example, a typical covered hopper railway car may carry up to about 190,000 pounds (about 5700 cubic feet) of plastic pellets. However, if the previous lading was red plastic pellets, very small residual quantities of the red pellets (e.g., only a few pellets) have been known to so contaminate a subsequent load of white plastic pellets as to render the quality of the white plastic pellets unacceptable, even though the pellets were of the same resin (e.g., polyethylene). Also, upon changing resins or resin grades even very small, residual quantities of residual resins from prior ladings may adversely affect the melt index or even contaminate a subsequent lading. Thus, there has been a long-standing problem in constructing railway covered hopper cars which could be readily cleaned, which did not have any unnecessary crevices or the like in which particulate or powdered ladings could become lodged, and which were relatively easy to thoroughly clean.

SUMMARY OF THE INVENTION

Among the several objects and features of the present invention may be noted the provision of a hopper outlet, such as described above, in which no void or opening resulted in which particulate or powdered ladings may become entrapped;

The provision of such a gasket which effectively seals the hopper frame relative to the outlet frame;

The provision of such a gasket which may be retrofitted to existing hopper cars without modification thereto; and The provision of such a gasket which is of durable construction, which is impervious to weather and temperature, and which has a long service life.

Other objects and features of the present invention will be in part apparent and in part pointed out hereinafter.

Briefly stated, in an unloading outlet for a railway hopper car or the like, the hopper car oftentimes has hopper walls sloping inwardly and downwardly, with a hopper frame carried by the lower portions of the hopper walls. An outlet is provided having an outlet frame which is adapted to mate with and to be secured to the hopper frame. A seal is provided between the hopper frame and the outlet frame for effectively sealing the outlet frame to the hopper frame, and for effectively preventing entrapment of powdered or particulate ladings between the hopper frame and the outlet frame.

BRIEF DESCRIPTION OF THE DRAWINGS

FIG. 1 is a cross sectional view of a pneumatic outlet for a covered hopper railway car, utilizing a gasket of the present invention, which prevents entrapment of particulate or powdered ladings at the interface between the outlet frame and the hopper frame;

FIG. 2 is an enlarged view of a portion of FIG. 1, taken along line 2—2 of FIG. 1, illustrating, the gasket of the present invention;

FIG. 3 is a view, taken along line 3—3 of FIG. 2, illustrating in even larger scale the gasket of the present invention in its uncompressed state;

FIG. 4 is a view similar to FIG. 2 on a somewhat enlarged scale, showing another embodiment of the gasket of the present invention, adapted to be retrofitted to existing hopper outlets;

FIG. 5 is a view of the gasket system shown in FIG. 4 in its uncompressed state; and FIG. 6 is a view similar to FIG. 2 of a typical prior art gasket for sealing between a pneumatic outlet and a hopper frame.

Corresponding reference characters indicate corresponding parts throughout the several views of the drawings.

DESCRIPTION OF PREFERRED EMBODIMENTS

Referring now to the drawings, a pneumatic outlet, as indicated generally by reference character 1, is shown to be attached to the lower portions of a hopper of a covered hopper railway car or the like. Pneumatic outlet 1 is generally similar to the outlet shown in the co-assigned U.S. Pat. No. 4,114,785, which is herein incorporated by reference. While a complete disclosure of this pneumatic outlet may be found in the above-noted co-assigned U.S. patent, certain of the more key components of the outlet will be herein disclosed. However, it will be understood that within the broader aspects of this invention, the exact construction of the pneumatic outlet does not, per se, constitute a part of the invention, and this invention may be used with a variety of hopper and outlet constructions.

Generally, pneumatic outlet 1 includes an air conduit 3 through which air may be drawn by means of a suction blower or the like (not shown). A control valve 5 at the bottom of outlet 1 may be selectively opened so that a particulate lading contained within a railway hopper car or the like, to which outlet 1 is secured, may fall downwardly into air conduit 3 so as to be entrained in the air stream flowing through the conduit such that the particulate lading may be air-conveyed from the outlet. It will be understood that a particulate lading may include any granular, powdered, or pelletized solid lading which will flow or can be poured. Some examples of such particulate ladings may include powdered ladings, such as flour or cement, granular ladings such as sugar, or pelletized ladings such as plastic resin pellets. However, within the broader aspects of this invention, any particulate, flowable, solid lading may be utilized.

Even more specifically, outlet 1 includes outlet slope sheets or walls 7 which extend inwardly and downwardly toward control valve 5 and air conduit 3. A generally rectangular outlet frame 9 is secured to the upper edges of the side and end outlet slope sheets 7. As best shown in FIGS. 2 and 3, outlet frame 9 includes a generally horizontal flange 11, having an upwardly facing frame surface 12 (as best shown in FIG. 3). Frame surface 12 is inclined at a slight acute angle A (e.g., about 3°) for purposes as will appear. A plurality of spaced holes 13 is provided around the flange 11 for purposes as will appear. Outlet frame 9 has an inner, generally vertical surface 14.

As generally indicated at 15, a hopper is provided to which outlet 1 is attached. Hopper 15 may, for example, be a hopper in a covered railway hopper car or the like. However, those skilled in the art will recognize that outlet 1 may be applied to hoppers other than those in railway car applications. More specifically, hopper 15 includes a plurality of hopper slope sheets 17 which angle inwardly and downwardly converging toward outlet 1. A hopper frame, as generally indicated at 19, is secured (e.g., welded) to the lower margins of the hopper slope sheets 17. Hopper frame 19 is constituted by an angle-shaped hopper flange 21 which has a downwardly-facing surface 22, as best shown in FIG. 2. A plurality of spaced holes 23 are provided in hopper flange 21, with the outlet frame flange holes 13 mating with the hopper flange holes 23. These mating outlet frame and hopper frame flange holes each receive a respective bolt 25. In this manner, with nuts 27 and washers 29 applied to the bolts 25, outlet 1 may be secured to hopper 15. Further, hopper frame 19 has an inwardly facing, generally vertical surface 30 (see FIG. 2).

In accordance with this invention, a gasket assembly, as generally indicated at 31, is provided between outlet frame 9 and hopper frame 19 so as to eliminate any gap or space between the outlet frame and the hopper frame, and so as to positively seal the outlet frame to the hopper frame in such manner as to prevent the leakage of lading from within hopper or outlet to the exterior, or to prevent atmospheric air from communicating with the interior of the hopper via the interface between the outlet frame and the hopper frame.

More specifically, gasket assembly 31 is shown to comprise a groove 33 provided in the upwardly facing surface 12 of flange 11 of outlet frame 9, with the groove 33 extending around the rectangular outlet frame 9. An elastomeric gasket, as generally indicated at 35, is received within groove 33. Preferably, gasket 35 is molded of a closed cell neoprene elastomeric material, such as is commercially available from the Rubatex Corporation of Bedford, Va., under the trade designation R-1574-N, or equal.

As best shown in FIG. 3, in its uncompressed state, gasket 35 has a gasket body 37 and a plurality of spaced holes 39 therein adapted to mate with holes 13 in outlet frame flange 11. The gasket further has a pair of spaced, continuous, upwardly extending protrusions or ribs, as indicated at 41a, 41b, with these protrusions being disposed on opposite sides of hole 39. The protrusions or ribs 41a, 41b extend up above the level of the upwardly facing outlet frame flange face 12, and are adapted to sealably mate with the downwardly facing hopper frame face 22 when outlet 1 is bolted to hopper frame 19 by bolts 25.

With gasket 35 installed in groove 33 in outlet mounting flange 11, and with the outlet flange 11 held in position on hopper flange 19 by means of bolts 25, the upwardly extending gasket protrusions 41a, 41b will make contact with and will seal the outlet frame 9 relative to the hopper frame 19 as bolts 25 are tightened. It will be appreciated that protrusions 41a, 41b will compress such that the gasket 35 in its compressed state will effectively seal the outlet frame to the hopper frame. It will be particularly noted in FIG. 2 that with bolts 25 sufficiently torqued so as to compress gasket 35, the upwardly facing surfaces 12 on outlet flange 11 bear directly against the downwardly facing surface 22 of hopper frame 19 such that there is metal-to-metal contact between the outlet flange 11 and the hopper flange 21, and such that a tight metal-to-metal interface or intersection, as indicated at 43, is provided on the inner surfaces 14 and 30, respectively, of the outlet frame and the hopper frame. Because upper surface 12 of frame flange 11 is inclined, as heretofore described, it will be appreciated that the inner edge of the outlet frame will first make metal-to-metal contact with the hopper frame at interface 43. This tight metal-to-metal interface 43 positively prevents entrappment of powdered or granular particulate ladings between outlet frame 9 and hopper frame 19, and thus facilitates cleanout of the hopper and the outlet.

Referring now to FIGS. 4 and 5, an alternative embodiment of the gasket system of the present invention is illustrated, with this alternative embodiment being indicated in its entirety by reference character 45. Generally, the parts of outlet 1 and hopper 15 are identical in construction and function with the parts described above, and thus corresponding reference characters indicate parts having a corresponding construction and function and thus, for the sake of brevity, a detailed description of these parts may be had by referring back to the previous portions of this disclosure.

It will be recognized that gasket 35 of gasket assembly 31 is required to be mounted within a groove 33 provided in the upper face of outlet frame flange 11. The provision of this groove 33 requires, of course, that the groove be machined within the flange. It will be recognized that the necessity of providing this groove in the flange can be readily carried out during manufacture, but it would present a problem in retrofitting existing outlets already in service. Thus, retrofit gasket assembly 45 is intended to be inserted between the outlet frame and the hopper frame without the requirement of any modification to either the outlet frame or the hopper frame.

More specifically, retrofit gasket assembly 45 is shown to comprise a generally "I"-shaped metal spacer 47, having an inner face 49, an outer face 51, a top face 53, and a bottom face 55. It will be noted that the inner end 49 of spacer 47 is preferably somewhat thicker than the outer end 51. An upwardly facing groove 57 is provided in top face 53, and a downwardly facing groove 59 is provided in bottom face 55, with the portion of spacer 47 between the upwardly and downwardly facing grooves constituting a web 61. A plurality of spaced holes 63 is provided in web 61 and holes 63 are adapted to mate with holes 13 and 23 provided in outlet frame 9 and in hopper frame 19, respectively. An upper elastomeric gasket 65 is received in upwardly facing groove 47, and a lower gasket 67 is received in downwardly face groove 59. Each of these upwardly and downwardly facing gaskets have a plurality of spaced holes which mate with holes 63 provided in web 61 of spacer 47. The upper and lower gaskets 65 and 67 are preferably of a compressible elastomeric material, such as a suitable closed cell neoprene, as disclosed above in regard to gasket 35. It is also preferable that the upper and lower gasket 65 and 67 be bonded within their respective grooves 57 and 59 by means of a suitable adhesive, such as an elastomeric adhesive cement commercially available from the Minnesota Mining and Manufacturing Company, of Minneapolis, Minn., under the trade designation EC 1300.

As illustrated in FIG. 5, with the upper and lower gaskets 65 and 67 bonded in place within their respective grooves 57 and 59, the respective upper and lower faces of the upper and lower gaskets protrude out beyond the upper and lower faces 53 and 55, respectively, of spacer 47. To install gasket assembly 45 between outlet frame 9 and hopper frame 19, the bolts 25 securing the outlet to the hopper frame are removed, and gasket assembly 47 is installed between the outlet frame and the gasket frame. Bolts 25, together with washers 29 and nuts 27, are reinstalled, and are uniformly tightened to a sufficient degree so as to compress the upper and lower gaskets 65 and 67 such that the upper and lower faces of the gaskets are generally co-planar with the upper and lower faces 53 and 55, respectively, of spacer 47.

As shown in FIG. 4, with the gaskets 65 and 67 so compressed, a metal-to-metal interface 71 is provided between the downwardly facing surface 22 of hopper frame 19 and the upwardly facing surface 53 of spacer 47. Further, another flush, metal-to-metal seal or interface 73 is provided between the upwardly facing surface 12 of outlet frame 9 such that no gap exists for the accumulation of lading between the spacer and the outlet frame. Because inner face 49 of spacer 47 is somewhat thicker than outer face 51, it is insured, upon tightening bolts 25, that tight metal-to-metal interfaces will be accomplished at interfaces 71 and 73, even though there may be some warpage of either the outlet frame 11 or the hopper frame 19. It will further be noted that the inner surface 49 of spacer 47 is generally co-planar with the inner face 75 of hopper frame 19. In this manner, gaps, crevices, and cracks between the hopper frame and the outlet frame are substantially eliminated so that even powdered ladings cannot be entrapped between the hopper frame and the mounting frame.

Referring now to FIG. 6, a typical prior art gasket heretofore utilized to seal outlet 1 to hopper 15 is shown. This prior art gasket, as indicated at G, typically consisted of an elastomeric strip which was interposed between outlet frame 9 and hopper frame 19, and was sealably compressed by means of bolts 25. However, a space, as indicated at S, oftentimes resulted between the inner portions of the hopper frame 19 and the outlet frame 9 such that particulate lading would become lodged within this space. Such lodged lading within space S was difficult to remove during clean-out of the hopper car.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. In an unloading outlet for a hopper or the like, said hopper having hopper walls and a hopper frame carried by said hopper walls below the lower portions of said hopper walls, said outlet having outlet walls and an outlet frame secured to said outlet walls above the upper portions thereof with said outlet frame being adapted to mate with and to be secured to said hopper frame, wherein the improvement comprises: said outlet frame having an upper face, a groove in said upper face and an inner surface, said hopper frame having a lower surface and an inner surface, and compressible seal means carried within said groove of said outlet frame thereby to prevent movement of said gasket relative to said outlet frame, said hopper frame and said outlet frame having a plurality of mating holes, a plurality of bolts received in said holes, said upper surface of said outlet frame being inclined downwardly at a slight angle relative to said lower surface of said hopper frame when the flanges are free of one another so that upon tightening of said bolts, said hopper and outlet frames are drawn into engagement with one another with initial metal-to-metal contact along said inner surface of said hopper and outlet frames with said inner faces being substantially coplanar for effectively preventing entrapment of powdered or granular lading between said hopper frame and said outlet frame.

2. In an unloading outlet as set forth in claim 1 wherein said seal means is an elastomer gasket having a pair of spaced ribs extending above said outlet frame for sealing engagement with said hopper frame, said upwardly protruding ribs being continuously disposed on said gasket with one said rib opposite sides of said holes.

* * * * *